(12) United States Patent
Ortner et al.

(10) Patent No.: US 11,312,649 B2
(45) Date of Patent: Apr. 26, 2022

(54) METHOD AND APPARATUS FOR REDUCING THE CAMBER IN THIN GLASSES

(71) Applicant: SCHOTT AG, Mainz (DE)

(72) Inventors: Andreas Ortner, Gau-Algesheim (DE); Thomas Rossmeier, Bodenheim (DE); Jürgen Vogt, Oberheimbach (DE); Marius Necel, Harxheim (DE)

(73) Assignee: SCHOTT AG, Mainz (DE)

( * ) Notice: Subject to any disclaimer, the term of this patent is extended or adjusted under 35 U.S.C. 154(b) by 1145 days.

(21) Appl. No.: 15/264,561

(22) Filed: Sep. 13, 2016

(65) Prior Publication Data

US 2017/0001898 A1    Jan. 5, 2017

Related U.S. Application Data

(63) Continuation of application No. PCT/EP2015/053176, filed on Feb. 16, 2015.

(30) Foreign Application Priority Data

Mar. 13, 2014   (DE) .......................... 102014103431.7

(51) Int. Cl.
    *C03B 17/06*    (2006.01)
    *C03B 23/037*   (2006.01)
(52) U.S. Cl.
    CPC .......... *C03B 17/068* (2013.01); *C03B 17/064* (2013.01); *C03B 17/067* (2013.01); *C03B 23/037* (2013.01)
(58) Field of Classification Search
    CPC ...... C03B 23/037; C03B 17/06; C03B 17/068
    See application file for complete search history.

(56) References Cited

U.S. PATENT DOCUMENTS 3,107,196 A    10/1963 Acloque
4,175,942 A *  11/1979 Lipp ...................... C03B 17/06
                                                         65/187
(Continued)

FOREIGN PATENT DOCUMENTS

CN    103553301    2/2014
EP      1048621   11/2000
(Continued)

OTHER PUBLICATIONS

International Search Report dated May 12, 2015 for corresponding PCT/EP2015/053176.
(Continued)

*Primary Examiner* — John M Hoffmann
(74) *Attorney, Agent, or Firm* — Ohlandt, Greeley, Ruggiero & Perle, L.L.P.

(57) ABSTRACT

A method for producing thing glass strips is provided that avoids camber defects. The method includes using a glass strip forming device that has a drawing device; drawing, using the drawing device, the thin glass strip away from the glass strip forming device; measuring, using a measuring device, variables that are dependent on a differing length of edges of the thin glass strip at at least two measurement locations spaced apart transversely to a longitudinal extension of the thin glass strip; determining a difference or a quotient of the variables. The difference or the quotient is used to determine a control variable by which the glass strip forming device is controlled so as to counteract a difference in velocities of the thin glass strip between the two opposite edges.

10 Claims, 6 Drawing Sheets

(56) References Cited

U.S. PATENT DOCUMENTS

| | | | |
|---|---|---|---|
| 6,502,423 | B1 | 1/2003 | Ostendarp et al. |
| 7,430,880 | B2 | 10/2008 | Butts |
| 2008/0282736 | A1* | 11/2008 | Filippov ............... C03B 17/064 65/90 |
| 2010/0126226 | A1 | 5/2010 | Zhou |
| 2012/0111054 | A1 | 5/2012 | Blanding et al. |
| 2012/0318020 | A1* | 12/2012 | Delia ................... C03B 17/067 65/29.19 |
| 2013/0180285 | A1* | 7/2013 | Kariya ................. C03B 17/064 65/29.11 |

FOREIGN PATENT DOCUMENTS

| | | |
|---|---|---|
| JP | H0517045 | 1/1993 |
| JP | 2003192361 | 7/2003 |
| JP | 2010105900 | 5/2010 |
| JP | 2010138046 | 6/2010 |
| JP | 2012509844 | 4/2012 |
| WO | 2008009472 | 1/2008 |
| WO | 2009058293 | 5/2009 |
| WO | 2012132425 | 10/2012 |
| WO | 2013066672 | 5/2013 |

OTHER PUBLICATIONS

International Preliminary Report on Patentability dated Jun. 15, 2016 for corresponding PCT/EP2015/053176.

\* cited by examiner

METHOD AND APPARATUS FOR REDUCING THE CAMBER IN THIN GLASSES

CROSS REFERENCE TO RELATED APPLICATIONS

This application is a continuation of International Application No. PCT/EP2015/053176 filed on Feb. 16, 2015, which claims benefit under 35 U.S.C. § 119(a) of German Application No. 10 2014 103 431.7 filed Mar. 13, 2014, the entire contents of both of which are incorporated herein by reference

BACKGROUND

1. Field of the Invention

The invention generally relates to the manufacturing and confectioning of thin glass strips. More particularly the invention relates to a method and an apparatus by means of which so-called camber defects can be reduced during the manufacturing of the thin glass strip. Camber defects are deformations of the glass strip so that the edge of the glass strip has a curvature.

2. Description of Related Art

Thin glass strips are often confectioned after the drawing process by being coiled up into a roll. If the glass strip has deformations such as camber defects, the edges of the individual turns will not be exactly superimposed. This may result in oblique side walls of the glass roll, inter alia. WO 2013/066672 A1 proposes to simultaneously coil up an electrostatically charged film which so to speak bonds the individual layers of the glass roll to one another with the edges aligned.

Another solution for allowing to coil up a glass strip so as to obtain straight side walls of the glass roll is known from US 2012/0111054 A1. The method proposed there is based on the idea to bend the glass strip and in this way impart an appropriate stiffness to the glass strip perpendicular to the longitudinal extension thereof, so that it is possible to guide the strip using rolls that engage the edges of the glass strip.

However, camber defects may furthermore induce stresses in the glass. But a particular disadvantage is that a glass strip that is guided laterally at the edges of the glass strip will shift sidewards when being unwound due to the curvature of the edge. This may interfere with subsequent processing steps, in particular those which require high accuracy.

Although the solutions known from WO 2013/066672 A1 and US 2012/0111054 A1 are indeed suitable for producing a glass roll with improved geometry, the above-mentioned problems are not solved, however, because any camber defects remain.

SUMMARY

The invention is therefore based on the object to be capable of producing a thin glass strip in which camber defects are avoided from the outset or at least significantly reduced in terms of the degree of error.

For this purpose, a control variable is used which can be determined through measurements and which allows to establish a stable control algorithm for minimizing the camber defect of the glass strip. Here, the starting point is the finding that the camber defect is caused by a locally varying shape modification rate.

Specifically, the invention provides a method for producing a thin glass strip using a glass strip forming device. The glass strip forming device comprises a drawing device. The drawing device draws the thin glass strip away from the glass strip forming device, and a measuring device measures variables which are dependent on differing lengths of the edges of the thin glass strip at at least two measurement locations spaced apart transversely to the longitudinal extension of the thin glass strip produced by the glass strip forming device, and the difference or the quotient of the variables is determined, and from the difference or the quotient a control variable is determined by means of which the glass strip forming device is controlled in a way so that a difference in the velocities of the thin glass strip between the two opposite edges of the thin glass strip is counteracted.

The shape modification or strain rate increases or decreases monotonically as a function of the width coordinate if a camber defect of the thin or ultra-thin glass strip is existing. If during advancement the velocities of the glass strip at the two spaced apart locations differ within a measurement time interval, this will result in a different length of the edges of the glass strip in the region of the glass strip section that passes past the measuring device during the measurement time interval. The edges of different lengths are causing a corresponding camber of the glass strip. It is now possible to determine a control signal from the difference, by means of which the manufacturing process of the thin glass is influenced so as to offset the camber.

Thus, because of the different edge lengths, the advancement rates or velocities at the two edges are different. According to one embodiment of the invention it is therefore contemplated to measure the difference or the quotient of the velocities of the thin glass strip or of variables that are a function of the velocity of the thin glass strip between at least two locations spaced apart along the width of the thin glass strip.

A corresponding apparatus for producing a thin glass strip according to the invention comprises a glass strip forming device including a drawing device for drawing away the thin glass strip, and the apparatus for producing a thin glass strip further comprises a control device including a measuring device, wherein the control device together with the measuring device is adapted to measure variables which are dependent on differing lengths of the edges of the thin glass strip at at least two locations spaced apart along the width of the thin glass strip, and to determine the difference or the quotient of the variables, wherein the control device is adapted to use the difference or the quotient to determine a control variable by means of which the glass strip forming device can be controlled such that a difference in the velocities of the thin glass strip between the two opposite edges of the thin glass strip is counteracted.

Thus, with precisely controlled alignment of the drawing velocities at the two edges of the thin glass strip the invention now permits to minimize camber defects from the outset.

A thin glass strip in the sense of the invention in particular refers to a glass strip that has a thickness of less than 1 millimeter, preferably less than 0.5 mm. The invention is particularly suitable for such thin glasses, since these glasses can be provided in coiled form so that a product is obtained which has very long edge lengths. Especially in such a product which is usually employed in a secondary production process as an intermediate product, camber defects are particularly relevant. Accordingly, the invention is furthermore particularly suitable for very thin glasses of a thickness of 0.2 millimeters or less. Such glasses are also referred to as ultra-thin glasses.

As to the control signal, in the simplest case the difference in velocity between the advance rates of the right and left side of the thin glass strip, or, more generally spoken, at the two spaced apart measurement locations can be chosen as the control signal, in continuation of this also the difference in length of the two edges of the strip resulting thereby, as measured close to the borders (=gross boundary) or near the net boundaries of the glass strip and within a measurement time interval. An advantage of measuring the difference in length is a higher sensitivity due to the integration of individual length elements.

BRIEF DESCRIPTION OF THE DRAWINGS

The invention will now be explained in more detail with reference to the accompanying drawings. In the figures, the same reference numerals designate identical or equivalent elements. In the drawings.

DETAILED DESCRIPTION

Figure 1:
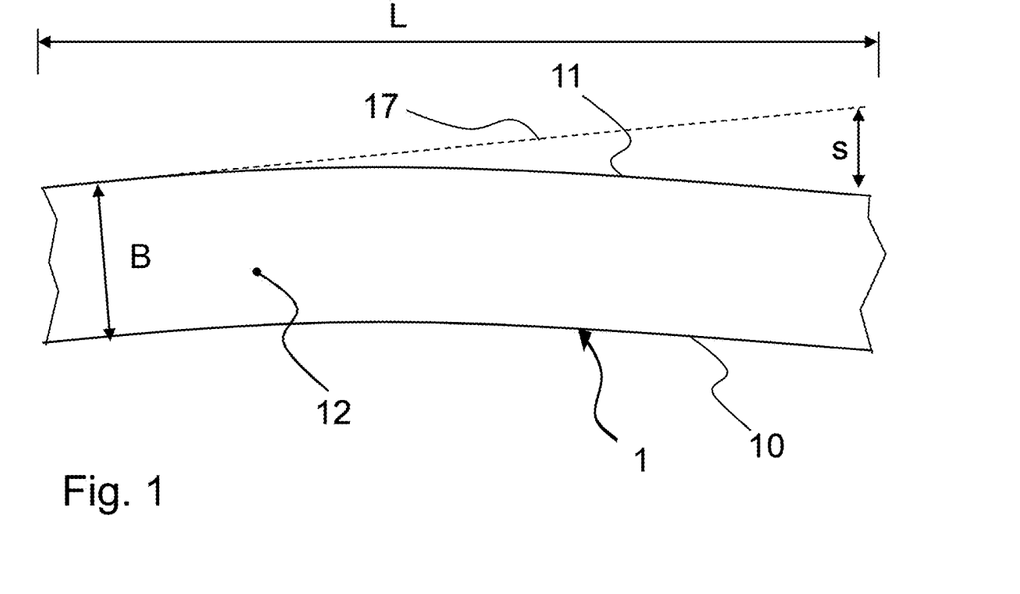
FIG. 1 shows a portion of a thin glass strip having a camber defect.

FIG. 1 shows a portion of a thin glass strip 1 in a plan view of one of the faces 12. Ideally, a thin glass strip 1 is straight, so that the edges 10, 11 of the strip are also straight and parallel. However, if in the hot forming process for creating the thin glass strip 1 a non-uniformity arises in a direction transversely to the longitudinal extension, such as a drawing force that varies over the width B of the thin glass strip 1, the thin glass strip 1 may have a curvature in the form of a camber defect. In this curvature, the curvature vector of the edges 10, 11 lies in the plane of the thin glass strip 1, which is in parallel to the surface of face 12.

Due to this curvature, the edge 11 of the thin glass strip 1 and a tangent 17 to the edge 11 are diverging, as shown in FIG. 1. Over a length L, this results in a spacing s of the relevant edge 11 from an ideal straight line or from the tangent 17 applied at the starting point of length L. Thus, a camber defect s per unit length L can be specified and quantified. This furthermore implies that the two opposite edges 10, 11 will have a different length over a length section of the thin glass strip 1.

Figure 2:
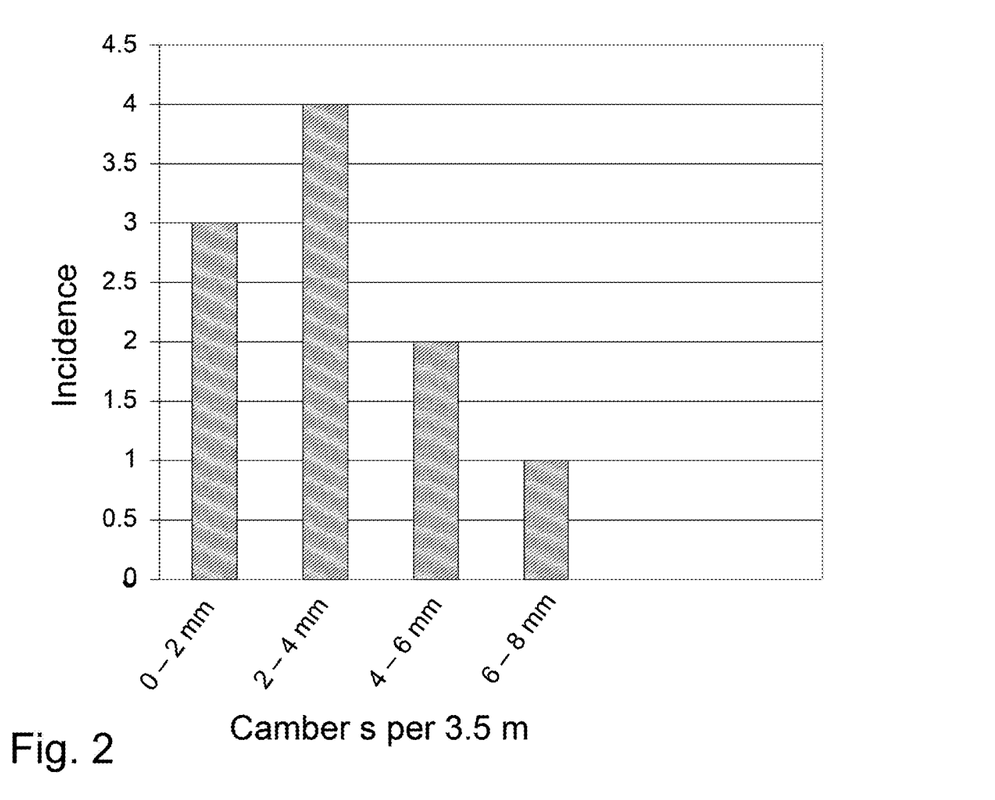
FIG. 2 shows an evaluation of the magnitude of the camber defect at portions of a thin glass strip not produced according to the invention.

FIG. 2 illustrates the magnitude of the camber defect of a thin glass strip not produced according to the invention. Sections of a length of 3.5 meters of the thin glass strip were admeasured. The sections were arranged with one end abutting a 4 meter steel ruler, and at the other end the spacing from the steel ruler was determined. FIG. 2 illustrates the incidence of a magnitude of the camber defect in a bar chart. As can be seen from the diagram, typical magnitudes of the camber defect are in a range of up to 10 mm over a length of 3.5 meters of the glass strip. Most camber defects amount to 2-4 mm per 3.5 meters glass strip length.

Figure 3:
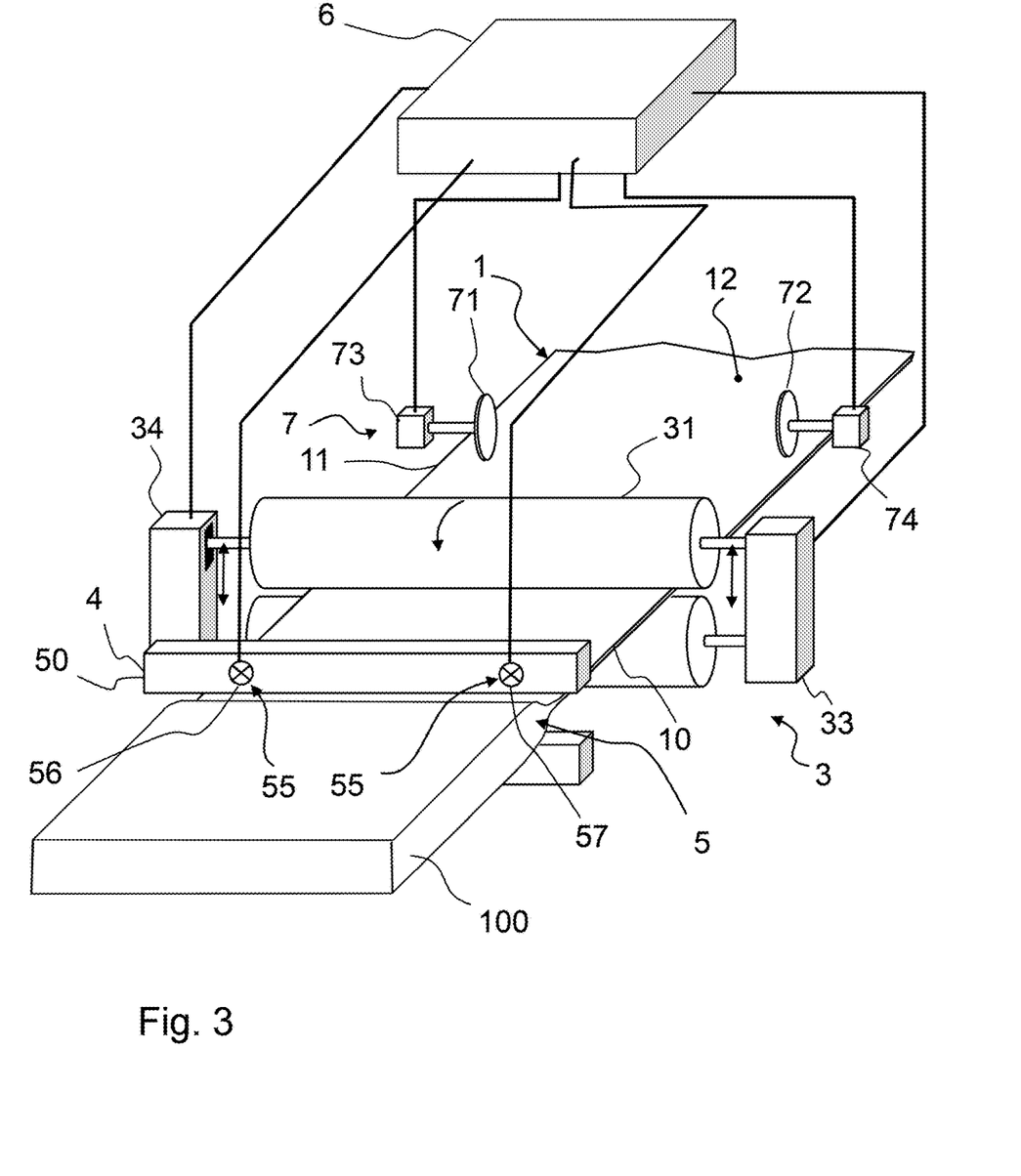
FIG. 3 is a schematic view of an exemplary embodiment of an apparatus for manufacturing thin glass strips.

The invention now permits to reduce the magnitude of such camber defects. The apparatus 2 according to the invention for producing a thin glass strip 1 as schematically shown in FIG. 3 in a perspective view comprises a glass strip forming device 4 with a drawing device 3 for drawing away the thin glass strip 1. A control device 6 with a measuring device 7 is provided, and the control device 6 with the measuring device 7 is adapted to measure variables that are a function of differing lengths of the edges 10, 11 of the thin glass strip 1 at at least two locations spaced apart along the width of the thin glass strip 1, and to determine the difference or the quotient of the variables. Control device 6 is adapted to use the difference or the quotient to determine a control variable by means of which the glass strip forming device 4 can be controlled by the control device 6 in a manner so that a difference in the velocities of the thin glass strip 1 between the two opposite edges 10, 11 of the thin glass strip 1 is counteracted.

According to a preferred embodiment of the invention, the compensation of a camber defect is achieved directly by influencing a hot forming process of the glass strip. A camber defect may in particular be offset here by adjusting or modifying, along the width of the thin glass strip and thus accordingly along the width of the hot forming section, the drawing forces exerted by the drawing device, which are acting on a hot forming section through the shaped thin glass strip.

For this purpose, it is suggested according to an embodiment of the method or apparatus for performing the method, that the thin glass strip is drawn away from a hot forming section by the drawing device, and that the drawing device is adapted to act on the thin glass strip at at least two locations spaced apart along the width of the thin glass strip. The drawing device is driven by the control device in a manner so that by a different drawing action at the two spaced apart locations a difference in the velocities of the thin glass strip between the two opposite edges of the thin glass strip is counteracted.

FIG. 3 schematically shows such an embodiment of an inventive apparatus for producing a thin glass strip 1, in which a camber defect is offset by influencing the hot forming process. Accordingly, the glass strip forming device 4 comprises a hot forming device 50 in this case. In the example shown in FIG. 3, the thin glass strip 1 is produced from a preform 100 by the hot forming device. For this purpose, the preform 100 is heated by a hot forming device 50 in a hot forming section 5. A drawing device 3 then draws the thin glass strip 1 out of the hot forming section 5. Due to the drawing operation a reduction in thickness is achieved with respect to the geometry of the preform 100. The drawing process may in particular be performed so that the reduction in thickness is considerably greater than a reduction in the width of the thin glass strip 1 compared to the width of the preform 100. Without being limited to the specific exemplary embodiment shown in FIG. 3, this may be achieved by keeping short the length of the deformation zone in hot forming section 5. In particular it is favorable for this purpose, to adjust the deformation zone, that is the area of the preform in which the major reduction in thickness occurs, so that the length thereof is not more than six times the thickness of the preform.

The heating device 50 for drawing the thin glass strip 1 from the preform 100 may comprise resistive heating elements, a burner assembly, a radiant heater, at least one laser, or combinations of these aforementioned means.

Moreover, it is generally favorable for drawing a thin glass strip 1 from a preform if the preform 100 is preheated. In this way, rapid heating to a glass viscosity that is suitable for drawing can be achieved, which facilitates the establishment of a short deformation zone in hot forming section 5.

As shown in FIG. 3, the drawing device 3 may comprise a drawing roller 31. According to one embodiment of the invention as illustrated in FIG. 3, a drawing roller is used which extends across the entire width of the thin glass strip 1.

According to the invention, the apparatus 2 for producing a thin glass strip 1 further comprises a control device 6 with a measuring device 7. The measuring device 7 may be adapted to measure the difference or the quotient of the velocities of the thin glass strip 1 or variables that are a function of the velocity of the thin glass strip 1 between at least two locations spaced apart along the width of the thin glass strip 1. The velocities at the measurement locations are dependent on the edge lengths. If one edge is longer than the other, a higher velocity of the longer edge will result for a given advancement rate.

According to one embodiment of the invention, which is also illustrated in the example shown in FIG. 3, the measuring device 7 comprises two wheels 71, 72 spaced apart transversely to the drawing direction, with sensors 73, 74 for detecting the rotation of the wheels 71, 72. The sensors 73, 74 may for example be rotary encoders, preferably incremental rotary encoders.

Thus, this embodiment of the invention employs a tactile measuring method. The two wheels are entrained in rotation due to the contact with the face 12 of thin glass strip 1 and due to the movement of the thin glass strip 1 along the drawing direction. From the measured values of sensors 73, 74, control device 6 may then determine a variable corresponding to the velocity of the thin glass strip 1. Besides the actual velocity, such variables may, for example, include the angular velocity of the wheel as well.

Sensors 73, 74 of measuring device 7 are connected to control device 6. So, the measured values of sensors 73, 74 can be evaluated in control device 6. More particularly, the control device 6 determines the difference or the quotient of the variables measured by sensors 73, 74. Control device 6 then determines a control variable from the difference or the quotient of the measured values. With this control variable, a drawing device 3 is controlled so as to counteract a difference in the velocities of the thin glass strip 1 between the two opposite edges 10, 11 of thin glass strip 1, by exerting a different drawing action at two locations spaced apart along the width of thin glass strip 1. These locations need not be identical to the measurement locations.

In order to achieve such a different drawing action, the contact pressure of drawing roller 31 may be varied in response to the control variable in order to counteract a difference in the velocities of thin glass strip 1 at the two edges 10, 11. In particular, the contact pressure of drawing roller 31 may be controlled by control device 6 in a manner so as to be varied at the two ends. For this purpose, two means 33, 34 for adjusting the contact pressure are provided in the example shown in FIG. 3, which are connected to control device 6 and by means of which the pressure on the bearings of the drawing roller 31 is adjustable controlled by control device 6. If now, for example, the contact pressure is increased at one of the edges 10, 11 of thin glass strip 1, this will result in an increase in the velocity of the glass strip on this side due to the better contact between the glass strip and the drawing roller 31, and thus the strip will be extended at this edge. By contrast, if the drawing roller 31 has a soft surface, an increase of contact pressure may lead to a higher compression of the roller material. Thereby, the effective circumferential length of the drawing roller 31 will be reduced so that the drawing rate thereof decreases. The latter embodiment is preferred.

In this case, for the portion of the thin glass strip as shown in FIG. 1, upon detection of a camber defect the contact pressure of drawing roller 31 would be decreased at edge 10 and/or increased at edge 11, to compensate for the camber defect shown in FIG. 1. That is because due to the curvature illustrated, edge 11 is in fact slightly longer than edge 10.

Another and particularly preferred embodiment of the invention is also based on a direct influence on the hot forming process of the thin glass strip. An action for offsetting a camber defect may include to modify the viscosity profile transversely to the drawing direction of the thin glass strip 1. The modification of viscosity is achieved in this case by adjusting or setting the temperature profile of the glass strip transversely to the drawing direction by suitable means. For this purpose, generally, without being limited to the example of FIG. 3, a heating or cooling device 55 is provided according to one embodiment of the invention, by means of which the temperature of the thin glass strip 1 can be locally modified in the direction transversely to the drawing direction of the thin glass strip 1. This heating or cooling device 55 is then controlled using the control variable and thus the temperature profile of the glass strip is modified transversely to the drawing direction in a manner so that a difference in the velocities of thin glass strip 1 between the two opposite edges 10, 11 of thin glass strip 1 is counteracted.

According to a refinement of this embodiment, at least two heating and/or cooling elements 56, 57 may be provided for this purpose as part of the heating or cooling device 55, which elements are spaced apart transversely to the drawing direction. If the glass strip is formed from a melt, these elements may as well be arranged in or at a drawing shaft downstream a drawing orifice, or on a drawing orifice, for example.

In the example shown in FIG. 3, the heating or cooling device 55 comprises two heating or cooling elements 56, 57 which are spaced apart transversely relative to the longitudinal extension of the thin glass strip and can be controlled by means of the control variable and are integrated in the hot forming device 50 or form part of the hot forming device 50. For being controlled, the two heating or cooling elements 56, 57 are connected to control device 6. Generally, without limitation to the illustrated example, the two heating or cooling elements 56, 57 may then be driven by control device 6 using the control variable in a manner so that the heating or cooling power of at least one of the heating or cooling elements 56, 57 is modified in order to adjust the temperature profile and hence also the viscosity profile of the glass transversely to the drawing direction.

It is also conceivable to drive only one of the heating or cooling elements 56, 57. For example, one of the heating or cooling elements 56, 57 could be operated with a fixed heating or cooling power, and at the other heating or cooling element 57, 56 the heating or cooling power could then be increased or decreased depending on the direction of the detected camber defect.

A typical control mechanism that makes use of the heating or cooling device 55 may in particular be provided as follows:

If a camber is detected by measuring device 7 from the difference or the quotient of the data measured or derived from the measurements, and a control variable is determined from the difference or the quotient, the glass strip forming device 4 may then be controlled using the control variable so that a difference of the velocities of the thin glass strip 1 between the two opposite edges 10, 11 of the thin glass strip 1 is counteracted.

This embodiment of the invention described above, in which the temperature of the thin glass strip 1 is locally modified in the direction transversely to the drawing direction of the thin glass strip 1 using a heating or cooling device 55 by driving the heating or cooling device 55 using the control variable and thus modifying the temperature profile of the thin glass strip 1 transversely to the drawing direction so that a difference between the velocities of the thin glass strip 1 between the two opposite edges 10, 11 of the thin glass strip 1 is counteracted, can moreover be combined with the other embodiments of the invention.

As can be seen from the example of FIG. 2, the camber defects are small compared to the length of the thin glass strip. Correspondingly small is the velocity difference at the measurement locations of the measuring device, that is at the two contact points of wheels 71, 72 with face 12 of the thin glass strip 1 in the example shown in FIG. 3.

To increase the accuracy of measurement, it is therefore contemplated according to one embodiment of the invention which is not limited to the embodiment of FIG. 3 and the special configuration of the measuring device including wheels 71, 72, to measure the distances covered by the thin glass strip 1 within a predetermined measurement time interval as the variables which are dependent on a different length of edges 10, 11 of the thin glass strip 1. In other words, the velocities detected by the sensors are integrated over a measurement time interval.

Integration of a velocity is advantageous, regardless of whether it is the velocity of the glass strip or the angular velocity of wheels 71, 72, since the accuracy of the measurement is increased by the integration. After all, the differences in length at edges 10, 11 of the thin glass strip are very small. If the most widely spaced measuring locations are chosen, their distance will substantially correspond to the width B of the thin glass strip. With a camber defect s and a length L of a portion of the glass strip the following then applies approximately for a length difference ⍰ L: ⍰ L=B*s/L. If, in accordance with the example shown in FIG. 2, a typical camber defect of 3 millimeters over a length of 4.5 meters is assumed, a length difference ⍰ L of 0.4 millimeters is resulting for a width B of the thin glass strip of 60 cm. Sufficient accuracy can be achieved with a measuring wheel, however, possible slip may be a disadvantage.

Therefore, alternatively or additionally, an optical and non-contact measuring method may be employed. According to one embodiment of the invention, the measuring device may comprise at least one laser Doppler sensor for this purpose.

Commercially available laser Doppler velocimetry (LDV) systems offer the possibility of mutual synchronization and hence highly accurate determination of the differential variables, typical accuracies are in the order of 0.01% of the measured value. Furthermore, an optical correlation method may be employed for detecting velocity or length differences at the measurement locations.

Figure 4:
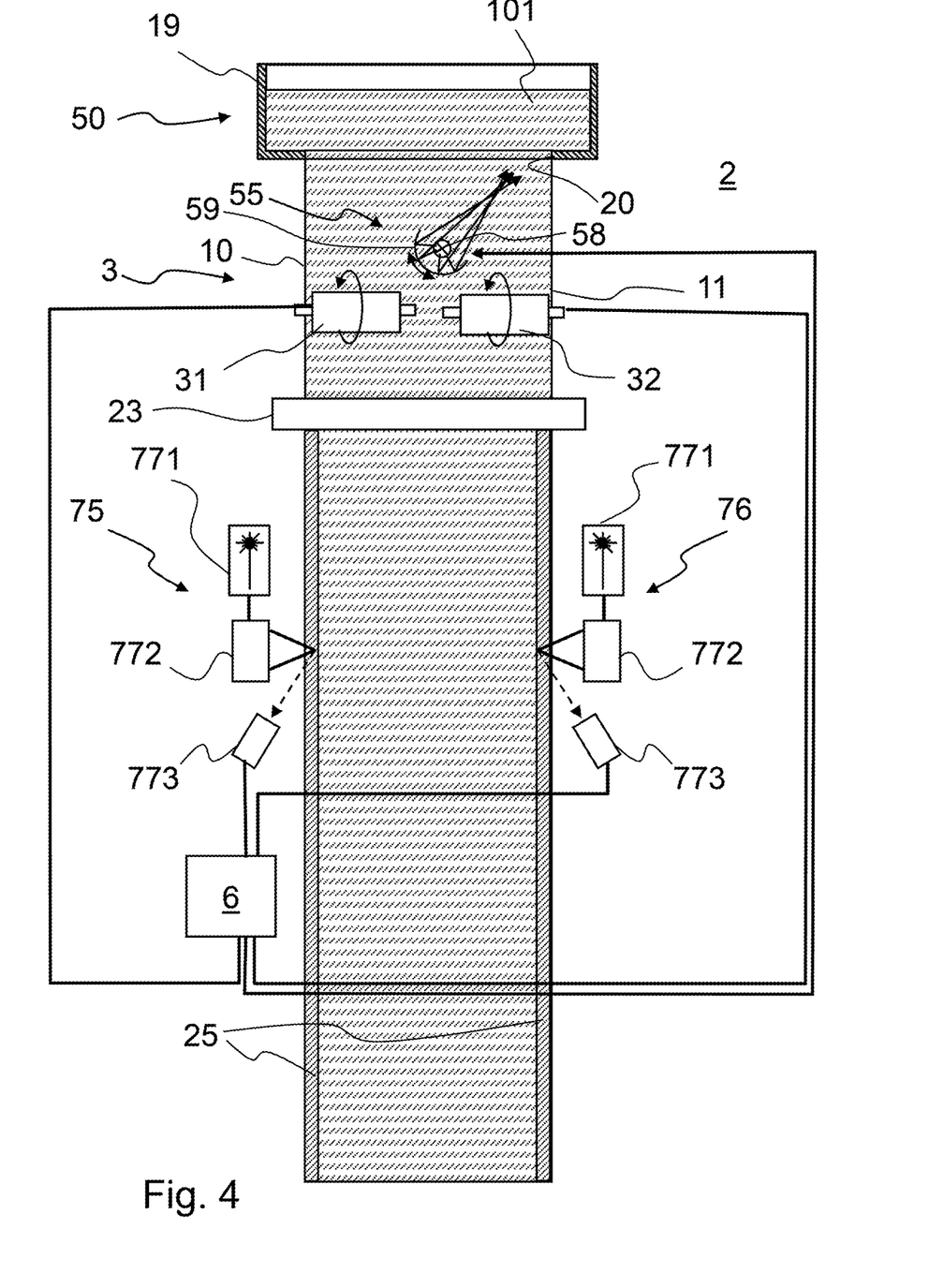
FIG. 4 is a schematic plan view of another exemplary embodiment of an apparatus for manufacturing thin glass strips.

FIG. 4 shows to an exemplary embodiment which employs an optical and contact-free measurement.

Other than in the example shown in FIG. 3, the glass strip is not produced by heating a preform 100 but by being formed from a melt 101. For example, as shown in the example, the shaping may be accomplished by drawing the glass strip 1 out of an orifice 20 of a container 19 for the molten glass 101. Besides such a down-draw process, other hot forming processes starting from the melt are possible as well, such as the float process or overflow fusion process, just to mention some.

The measurement method described below may of course also be applied to other glass forming processes which in particular include the shaping from a heated preform 100 as illustrated in FIG. 3.

In the embodiment shown in FIG. 4, the measuring device 7 comprises two laser Doppler sensors 75, 76. The configuration and function of laser Doppler sensors is per se known to a person skilled in the art. One possible type of such a sensor is still be described by way of example with reference to FIG. 4. In the illustrated example, the laser Doppler sensors are differential Doppler sensors. Each of the sensors comprises a laser 771. Each of the laser beams of lasers 771 are split into two beams in a respective beam splitter 772. The two laser beams are superimposed on or within glass strip 1, while the partial beams are directed to the glass strip at different angles. Each of laser Doppler sensors 75, 76 further comprises a light detector 773 which detects the light scattered at the glass strip from the region of superposition of the partial beams. Due to the movement of the glass strip 1 and the different angles of the partial beams, the scattered light of the partial beams will exhibit a different Doppler shift. This different Doppler shift of the scattered waves superimposed in light detector 773 leads to a time-varying light intensity with a beat frequency that is a function of velocity and proportional to the velocity of the glass strip 1.

With lasers 771 of the same light wavelength, the control device 6 may now determine a velocity difference from a difference of the beat frequencies detected by the light detectors. The measurement of beat frequencies may likewise be averaged over time. This corresponds to an integration over a given measurement time interval, namely the time interval for averaging. Similarly, the beat cycles within a predetermined time interval may be counted and thus integrated or summed up. The number of beat cycles within a measurement time interval is a variable representing the length of the glass strip moving past the detectors at the measuring location during the period of addition of the beat cycles. Because of the addition, such a measurement is very accurate.

Accuracy may further be increased by mutual synchronization of the two laser Doppler sensors 75, 76. Commercially available laser Doppler systems offer the possibility of such mutual synchronization. In this manner a highly accurate determination of the differential values is possible. Typical accuracies are in the order of 0.01% of the measured value.

Similarly to the example shown in FIG. 3, the laser Doppler sensors 75, 76 are connected to control device 6. This control device 6 now determines a control variable from the measured values, by means of which the drawing device 3 is driven in a manner so that a difference in the velocities of the glass strip or a related differing length at the edges 10, 11 is counteracted.

However, a disadvantage of a Doppler measurement method in case of a glass strip is the low scattering intensity due to the smooth surface, and thus the low measurement signal.

This problem can be mitigated by being employed in the region of the borders of the thin glass strip 1 (because the surface is comparatively rougher there), or by using tracer particles.

According to one embodiment of the invention, therefore, a device for applying light-scattering particles on the thin glass strip 1 may be arranged upstream the measuring device as seen in the advancement direction of the thin glass strip 1, which device is adapted to apply the light scattering particles to strip-shaped areas of the thin glass strip 1 where the measurement locations of measuring device 7 are chosen.

Improvements in signal quality are also achieved if strength-increasing coatings are used at the edges. The breaking strength of a thin glass strip highly depends on the quality of the edges. If cracks are existing at the rim of thin glass strip 1 in the region of edges 10, 11, breakage may be caused very easily when the strip is bend, for example when being coiled up. According to one refinement of the invention it is now suggested, as illustrated in FIG. 4 by way of example, to apply a preferably strip-like coating 25 to the edges of thin glass strip 1 by a coating device 23 arranged upstream measuring device 7, and to choose the measurement locations of measuring device 7 on the coated areas of the thin glass strip 1. With this embodiment, a double benefit is obtained because the coating 25 may have a strength-increasing effect on the one hand and on the other hand improves the measurement of the length- or velocity-dependent measured data. As mentioned before, with respect to the optical measurement, in particular with laser Doppler sensors, the scattered light signal is improved by increased scattering in or on coating 25 in comparison to uncoated glass. Even in case of a mechanical measurement such as shown in FIG. 3 by way of example, such a coating 25 may be advantageous if it is appropriate to reduce or even eliminate any slip of wheels 71, 72.

Instead of a single drawing roller 31 that extends across the width of thin glass strip 1, two separate drawing rollers 31, 32 are provided in the apparatus 2 shown in FIG. 4, which are acting upon different areas of the thin glass strip 1 transversely to the drawing direction.

As with the drawing device 3 in FIG. 3, one of the drawing rollers or both drawing rollers 31, 32 may comprise a means for varying the contact pressure of drawing roller 31, 32 along the axial extension thereof in response to the control variable.

In the case of two separate drawing rollers 31, 32 it is however as well possible to vary the contact pressure or the drawing force between the two drawing rollers 31, 32 so that in response to the control variable one of the drawing rollers pulls stronger than the other to counteract a camber. Of course, such a drawing device may also be employed in an differently configured apparatus 2 for producing the thin glass strip 1, for example in the embodiment shown in FIG. 3. In other words, according to a further embodiment of the invention, that is to say not limited to the embodiment shown in FIG. 4, a drawing device 3 is provided which comprises two drawing rollers 31, 32 spaced apart transversely to the drawing direction, wherein at least one of the drawing rollers 31, 32 has means adjustable in response to the control variable for varying the contact pressure or drawing force. The drawing force may for example be modified by adjusting the torque as a control variable determined by the control device.

Alternatively or in addition to an influence on the velocity of the strip by means of drawing rollers 31, 32, a heating or cooling device 55 may again be provided, by means of which the viscosity profile of the thin glass strip 1 is adjusted in the direction transversely to the drawing direction in response to a control variable determined by control device 6. According to another embodiment which is also illustrated in the example of FIG. 4, the heating or cooling device 55 may comprise a radiant heating element 58 and radiation directing means 59. The radiation emitted by radiant heating element 58 is directed, by radiation directing means 59, to a location whose position in a direction transversely to the drawing direction of the thin glass strip 1 depends on the control variable. In this way it is possible to locally heat specific areas of the glass strip. Using the control variable, the radiation directing means 59 is now driven so as to direct the radiation to a specific location on the thin glass strip determined by the control variable. In the example shown in FIG. 4, the radiation is currently being directed to the area adjacent to edge 11 of the thin glass strip 1, so that the glass is heated more strongly in this region than in the region of edge 10. Thus, the viscosity of the glass which is still soft is lowered in the region of edge 11 compared to the opposite edge 10. This causes an extension of edge 11 relative to edge 10 and hence compensation of a camber for which the velocity of edge 10 is higher than that of edge 11.

Figure 5:
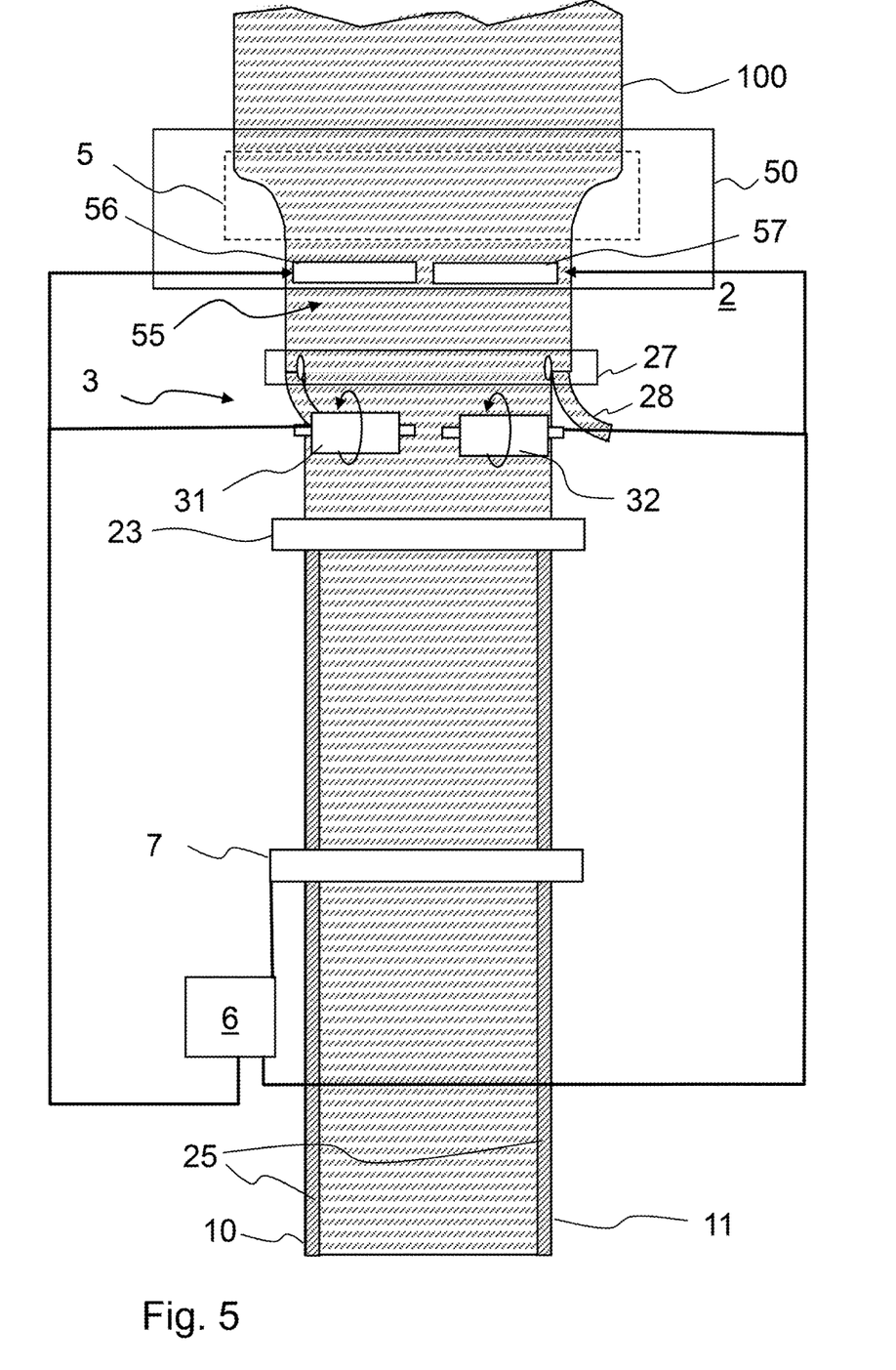
FIG. 5 shows an example of an apparatus with a non-contact optical measuring device and a border severing device.

FIG. 5 shows a plan view of another example of an apparatus 2 with a non-contact optical measuring device 7. Similarly to the example shown in FIG. 3, the thin glass strip 1 is here again drawn from a preform 100 by a hot forming device 50. The reshaping of preform 100 into a thin glass strip 1 of a thickness of preferably 0.2 mm and less is accomplished in a hot forming section 5 of hot forming device 50.

Similarly to the apparatus shown in FIG. 4, optical non-contact measurement of the velocity or length difference by a measuring device 7 is again suggested by way of example, for example using laser Doppler sensors 75, 76. In order to improve scattering intensity of the laser light and edge fracture resistance, a coating device 23 is provided like in the example of FIG. 4, which applies a strip-like coating 25 to the rims of the thin glass strip, that means to the areas of the glass surface adjacent edges 10, 11. The measurement locations of measuring device 7 are also chosen on the coated areas of thin glass strip 1.

In addition to the examples shown in FIGS. 3 and 4, a border severing device 27 is additionally provided here, which cuts border 28 that are thickened due to the hot forming process from the rims of thin glass strip 1 so as to achieve a most uniform thickness possible over the entire width of the glass strip. Severing of the borders may be effected using a scribing wheel, or by thermal laser beam separation with a laser beam.

Coating device 23 is arranged downstream of border severing device 27 in the advancement direction of the thin glass strip 1, so that the new edges 10, 11 newly created by border severing device 27 are protected.

Like in the example shown in FIG. 4, any existing velocity or length difference at the measurement locations at the two edges of the thin glass strip may now be determined using measuring device 7, and based on the measured data the control device 6 may determine a control variable by means of which the drawing device 3 is then controlled to counteract a camber of thin glass strip 1.

According to one embodiment of the invention, the apparatus 2 comprises a border severing device 27 and a coating device 23 that is arranged downstream of border severing device 27 in the advancement direction of the thin glass strip 1 for applying a coating to the rims of the thin glass strip 1 processed by border severing device 27, and measuring device 7 is arranged so that the measurement locations will be on the coating 25.

Particularly suitable as a coating material for protecting the edges 10, 11 and for enhancing signal intensity in optical measuring methods such as the laser Doppler method or for reducing slip in a mechanical measuring method, are lacquers and plastic materials.

As in case of the apparatuses according to FIG. 3 and FIG. 4, again, the contact pressure of the one or more drawing rollers 31, 32 can be adjusted using the control variable determined by control device 6 in order to compensate for a camber defect. Preferably, however, again alternatively or additionally, the temperature profile and thus the viscosity profile is affected by a heating or cooling device 55, for example by employing two heating or cooling elements 56, 57 that are offset transversely to the drawing direction, as illustrated. In order to determine the control variable that is to be used to reduce the camber, any velocity and/or length measurement method may be employed in principle for determining the velocities of the glass strip at the edges thereof or for determining differences in length of the edges.

By way of the example shown in FIG. 6, another very accurate measurement method shall be explained below, by means of which the differences in edge lengths of the thin glass strip 1 can be determined and can be used to offset a camber defect. The example is based on an embodiment of the inventive method in which the variables that are determined as a function of a differing length of edges 10, 11 of thin glass strip 1 are the positions of the thin glass strip 1 in the region of a bend of the thin glass strip 1. For this purpose, FIG. 6 shows a portion of apparatus 2 with drawing device 3 and measuring device 7.

Figure 6:
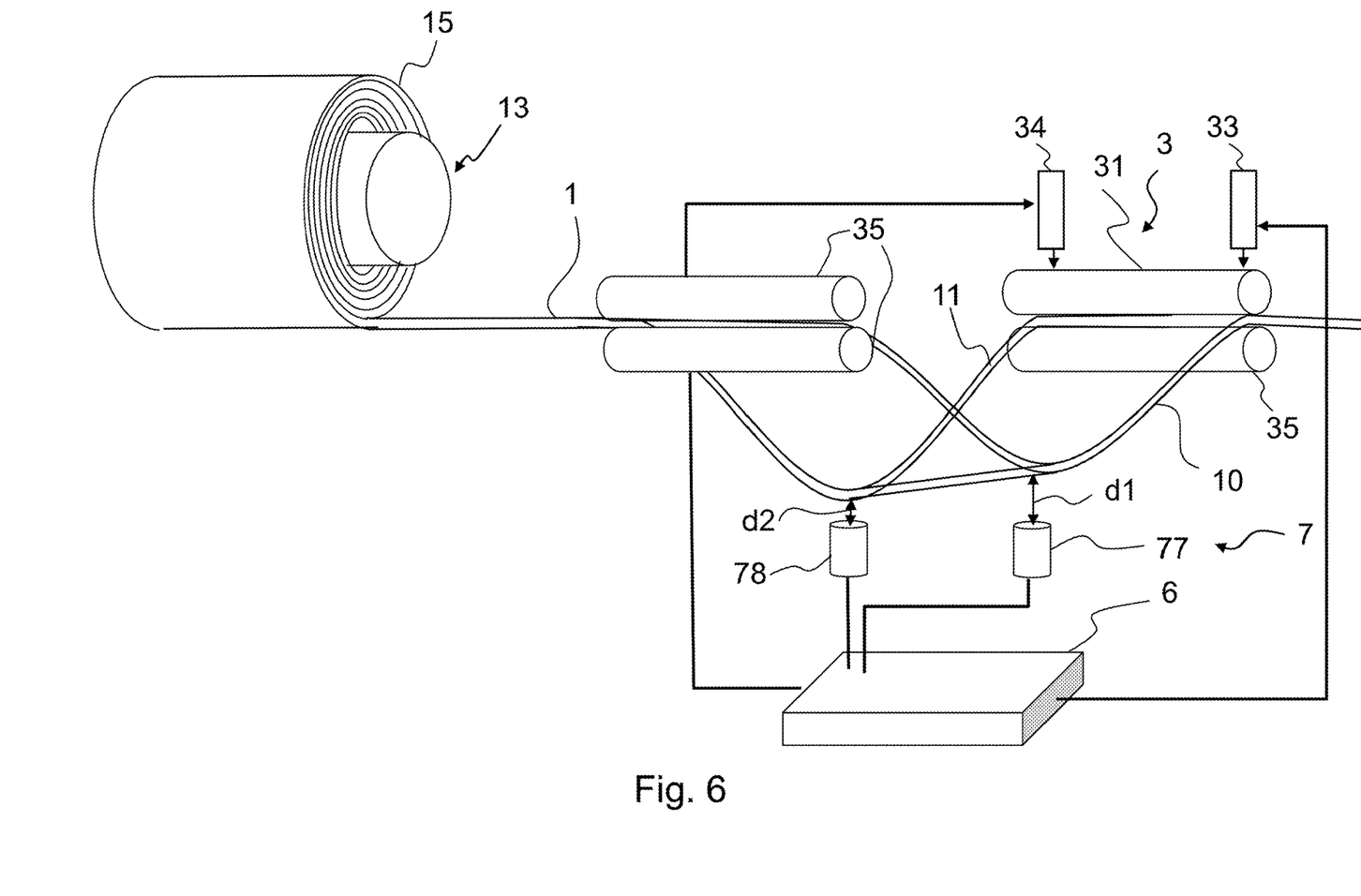
FIG. 6 shows an embodiment of the measuring device with a distance measurement for determining the position of the thin glass strip.

As can be seen from FIG. 6, the thin glass strip 1 is guided between rollers 35 such that it forms a strap that is slack so that a downward bend is defined. Measuring device 7 comprises at least two distance sensors 77, 78 for measuring the position of the thin glass strip 1 in the region of a bend of thin glass strip 1. The distance sensors are arranged such that their measuring locations are spaced apart transversely to the drawing direction or longitudinal extension of the thin glass strip 1.

A camber defect and the different edge lengths of the strip now implies that a small angle is resulting between the longitudinal extension of the thin glass strip 1 and the drawing direction. As a result of the angle and the different edge lengths, the two edges 10, 11 will exhibit a different bend.

In the region of the bend of thin glass strip 1 or of a slacking strap thereof, the distance of the strip to a reference position will therefore also change. As illustrated in FIG. 6, distance sensors 77, 78 may now be provided, which detect the position of thin glass strip 1 at the measurement locations in the form of a distance measure. The distance readings of the two sensors are supplied to control device 6 which then accordingly calculates a control variable by means of which the glass strip forming device is driven such that the camber defect is counteracted. In the example shown in FIG. 6, distance d2 of the thin glass strip to distance sensor 78 in the region of edge 11 is smaller than distance d1 to distance sensor 77 in the region of edge 10. Here, the distance sensors are arranged so as to measure in the opposite direction of the curvature vector of the glass strip. At the side where the bend of thin glass strip 1 is larger, the edge length will be greater. In the example shown in FIG. 6 this is the case for edge 11. Due to the greater bend, the distance to distance sensor 78 is smaller here. The camber defect which causes the differential distance d1−d2 detected by distance sensors 77, 78 therefore corresponds to the deformation shown in FIG. 1, in case of which edge 11 is longer than edge 10.

For the correction of camber defects, means 33, 34 for adjusting the contact pressure of a drawing roller 31 are provided in FIG. 6 by way of example, similar to FIG. 3. Means 33, 34 are controlled appropriately using the control variable determined by control device 6.

The effect of the different curvature of the thin glass strip 1 is especially enhanced by the fact that the center of the strip is shifted relative to the apparatus 2 or to the target position due to the camber defect. This shift results in a significantly different curvature of the glass strip in the region of a bend or deflection, even if the camber defect and the difference in length or velocity is very small. This is due to a continuously increasing lateral displacement of the thin glass strip 1 even in case of a small camber defect.

Thus, a difference in length of edges 10, 11 can be correlated to a corresponding difference in the depth of the slacking portion and thus can be derived from a double distance measurement (right and left).

Suitable measurement methods for the distance sensors include ultrasonic distance measurement or chromatically encoded distance measurement. The latter offer accuracies down to the submicron range. The principle of chromatically encoded distance measurement is also known from WO 2008/009472 A1. With respect to the configuration and function of a chromatically encoded distance sensor, the disclosure of WO 2008/009472 A1 is fully incorporated into the present application by reference. The measuring principle of a sensor for chromatically encoded distance measurement is based on the fact that this measuring device focuses different colors at different depths, and that the light reflected or scattered from the surface is received by the measuring head, is spatially split spectrally, and an intensity spectrum is captured. From the location of a maximum in the intensity spectrum, which is caused by the increased reflection and scattering at the surface of the thin glass strip, the distance of the glass surface from the sensor can then be determined.

Triangulation and capacitive distance measurements may give very accurate distance measurements as well. However, the oblique slacking strap or the different distances d1, d2 resulting therefrom are typically recognizable already without aids. Therefore, an accurate distance measurement provides very accurate information about the shape and magnitude of a camber defect. With a corresponding precision the error can be corrected.

In the example shown in FIG. 6, a winding device 13 is additionally shown, by means of which the thin glass strip 1 is coiled up into a roll 15. The coiling of the thin glass strip into a roll 15 is a packaging process preferred by the invention, since in this way the glass can be easily stored and directly unwound from the roll in a further processing operation. The cutting lines or the size of the products produced therefrom need only be defined during the further processing. Therefore, such a winding device 13 may be provided in all other embodiments of the invention described herein.

The embodiment of FIG. 6 illustrates that even small camber defects can have a major impact, since a single camber defect or a single small difference in length of the edges per strip section causes a continuously increasing offset of the center position of the glass strip. In the apparatus of FIG. 6 the result thereof is a clearly visible oblique strap. Furthermore, when the strip is coiled up or unwound, the error continues to sum up. If, for example, such a strip is unwound in a further processing operation, tensions may arise transversely to the longitudinal extension in case of such a camber defect, which will then relax in jerky transverse movements.

With the invention, camber defects are not only reduced in magnitude. Rather, the counteracting during the production process also results in a reduction of the wavelength or period of camber defects. The period is primarily determined by the distance of the measuring device 3 to the glass strip forming device 4, the latter being influenced by the measured variable. This distance can be readily kept at less than 20 meters, preferably less than 10 meters. If now a camber is counteracted, the direction of the camber defect will be reversed. This implies that in a subsequent section of the strip the difference of edge lengths will change the sign. Consecutive sections with camber defects of different directions are thus limited to lengths in the order of the abovementioned distance of less than 20 meters, preferably less than 10 meters.

Figure 7:
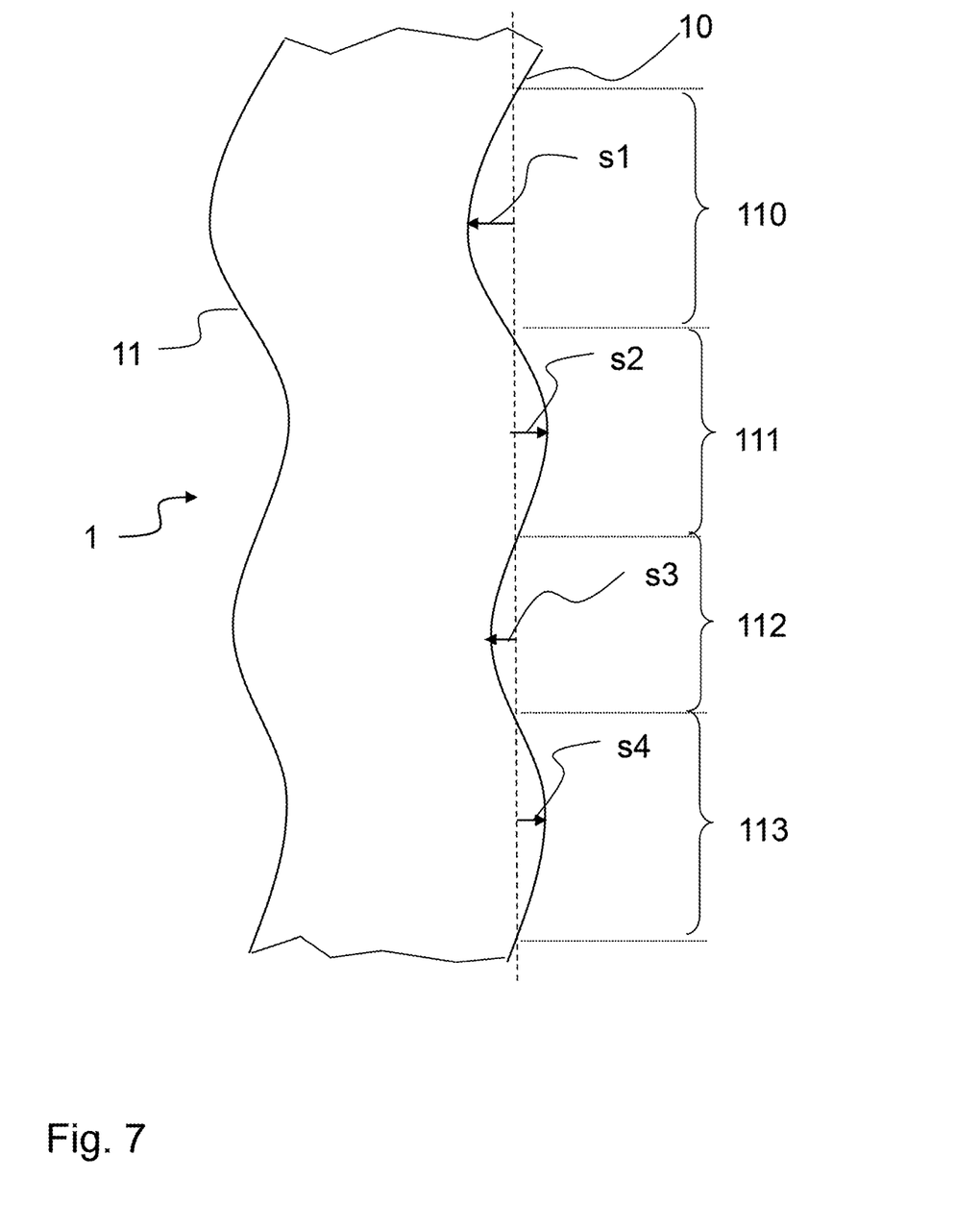
FIG. 7 shows a portion of a thin glass strip with camber defects in alternating directions.

For illustrating purposes, FIG. 7 shows a longitudinal portion of a thin glass strip 1 produced according to the invention. The camber of thin glass strip 1 is greatly exaggerated. At edge 10, the nominal position of the edge is shown as a dashed line. Because of the camber the position of the edge now differs from this nominal position. The associated camber defects in form of a deviation from the nominal position are denoted by s1, s2, s3, s4 and are illustrated as arrows. The direction of the arrows corresponds to the respective direction of the curvature vector of edge 10. The direction of the camber defect now reverses in each of the successive longitudinal sections 110, 111, 112, 113. More precisely, the component of the camber defect in the direction perpendicular to the longitudinal extension of the thin glass strip 1 changes sign in longitudinal sections 110, 111, 112, 113. As discussed above, with the inventive method the length of the longitudinal sections in which the camber defect and accordingly also the curvature vector does not change sign is now limited.

Therefore, a thin glass strip 1 is furthermore provided according to the invention, which has successive longitudinal sections 110, 111, 112, 113 exhibiting a curvature transversely to the longitudinal extension, wherein the component of the curvature of the thin glass strip 1 in the transverse direction changes sign in each consecutive section, wherein the longitudinal sections 110, 111, 112, 113 have a length of not more than 20 meters, preferably not more than 10 meters. Simultaneously with this reduction of the camber period achieved by the control according to the invention, the amplitude of the camber particularly decreases as well.

It will be apparent to those skilled in the art that the invention is not limited to the exemplary embodiments illustrated in the figures, but rather may be varied in multiple ways. The features of the exemplary embodiments may in particular be combined. For example, it is possible to combine different measurement devices, e.g. laser Doppler sensors such as illustrated in FIGS. 4 and 5 and distance sensors 77, 78 or mechanical sensors such as shown in FIG. 6 and FIG. 3. Also, the invention was illustrated in the figures with respect to controlling a drawing device 3 by control device 6. However, it is for instance likewise possible to affect the hot forming device 50. For example, a camber defect may also be influenced by varying the temperature profile transversely to the longitudinal extension of the thin glass strip during hot forming.

This may be accomplished easily by varying the heating power, for example by separately driving two or more heating means that are arranged offset to one another.

| LIST OF REFERENCE NUMERALS | |
|---|---|
| 1 | Thin glass strip |
| 2 | Apparatus for producing a thin glass strip |
| 3 | Drawing device |
| 4 | Glass strip forming device |
| 5 | Hot forming section |
| 7 | Measuring device |
| 10, 11 | Edges of 1 |
| 12 | Face of 1 |
| 13 | Winding device |
| 15 | Roll |
| 17 | Tangent to 10, 11 |
| 19 | Molten glass container |
| 20 | Slotted orifice |
| 23 | Coating device |
| 25 | Coating |
| 27 | Border severing device |
| 29 | Border |
| 31, 32 | Drawing roller |
| 33, 34 | Means for adjusting contact pressure |
| 35 | Rollers |
| 50 | Hot forming device |
| 55 | Local heating and/or cooling device |
| 56, 57 | Heating or cooling elements |
| 58 | Radiant heating element |
| 59 | Radiation directing means |
| 71, 72 | Wheel |
| 73, 74 | Sensor for detecting rotation of 71, 72 |
| 75, 76 | Laser Doppler sensor |
| 77, 78 | Distance sensor |
| 100 | Preform |
| 101 | Melt |
| 110, 111, 112, 113 | Longitudinal sections of 1 |
| 771 | Laser |
| 772 | Beam splitter |

What is claimed is:

1. A method for producing a thin glass strip, comprising:
    drawing, using a drawing device, the thin glass strip away from a glass strip forming device;
    measuring, using a measuring device, variables that are dependent on a differing length of edges of the thin glass strip at two measurement locations spaced apart transversely to a longitudinal extension of the thin glass strip;
    determining a difference or quotient of the variables;
    determining a control variable from the difference or quotient; and
    using the control variable to control the glass strip forming device so as to counteract a difference in velocities of the thin glass strip between the edges of the thin glass strip.

2. The method as claimed in claim 1, wherein the step of using the control variable comprises locally modifying a temperature of the thin glass strip in a direction transversely to a drawing direction of the thin glass strip using a heating and/or cooling device by controlling the heating and/or cooling device using the control variable to modify a temperature profile of the thin glass strip transversely to the drawing direction.

3. The method as claimed in claim 2, wherein the heating and/or cooling device comprises at least two heating and/or cooling elements spaced apart transversely to the drawing direction, and wherein the at least two heating and/or cooling elements are controlled by a control device using the control variable so that a heating or cooling power of at least one of the heating and/or cooling elements is modified so as to adjust the temperature profile of the thin glass strip transversely to the drawing direction.

4. The method as claimed in claim 2, wherein the heating and/or cooling device comprises a radiant heating element and radiation directing device, and wherein radiation emitted by the radiant heating element is directed, by the radiation directing device, to a location at a position in a direction transversely to the drawing direction of the thin glass strip that depends on the control variable.

5. The method as claimed in claim 1, wherein the thin glass strip is drawn away from a hot forming section by the drawing device, wherein the drawing device is adapted to act on the thin glass strip at least two locations spaced apart along the width of the thin glass strip, wherein the drawing device is controlled so that the difference in velocities of the thin glass strip between the edges is counteracted by a different drawing action at the two spaced apart locations.

6. The method as claimed in claim 1, wherein the difference in velocities of the thin glass strip is measured at the two measurement locations or based on variables that are a function of the velocity of the thin glass strip at the two measurement locations.

7. The method as claimed in claim 6, further comprising measuring, as the variables, the distances traveled by the thin glass strip within a predetermined measurement time interval.

8. The method as claimed in claim 7, wherein the drawing device comprises a drawing roller, wherein, for counteracting a difference in the velocities of the thin glass strip at the edges thereof, a contact pressure of the drawing roller is varied.

9. The method according to claim 1, wherein the two measurement locations are in a region of a bend of the thin glass strip.

10. The method as claimed in claim 1, further comprising applying a coating to rims of the thin glass strip, by a coating device arranged upstream of the measuring device, wherein the two measurement locations are on coated areas of the thin glass strip.

* * * * *